Figure 1:
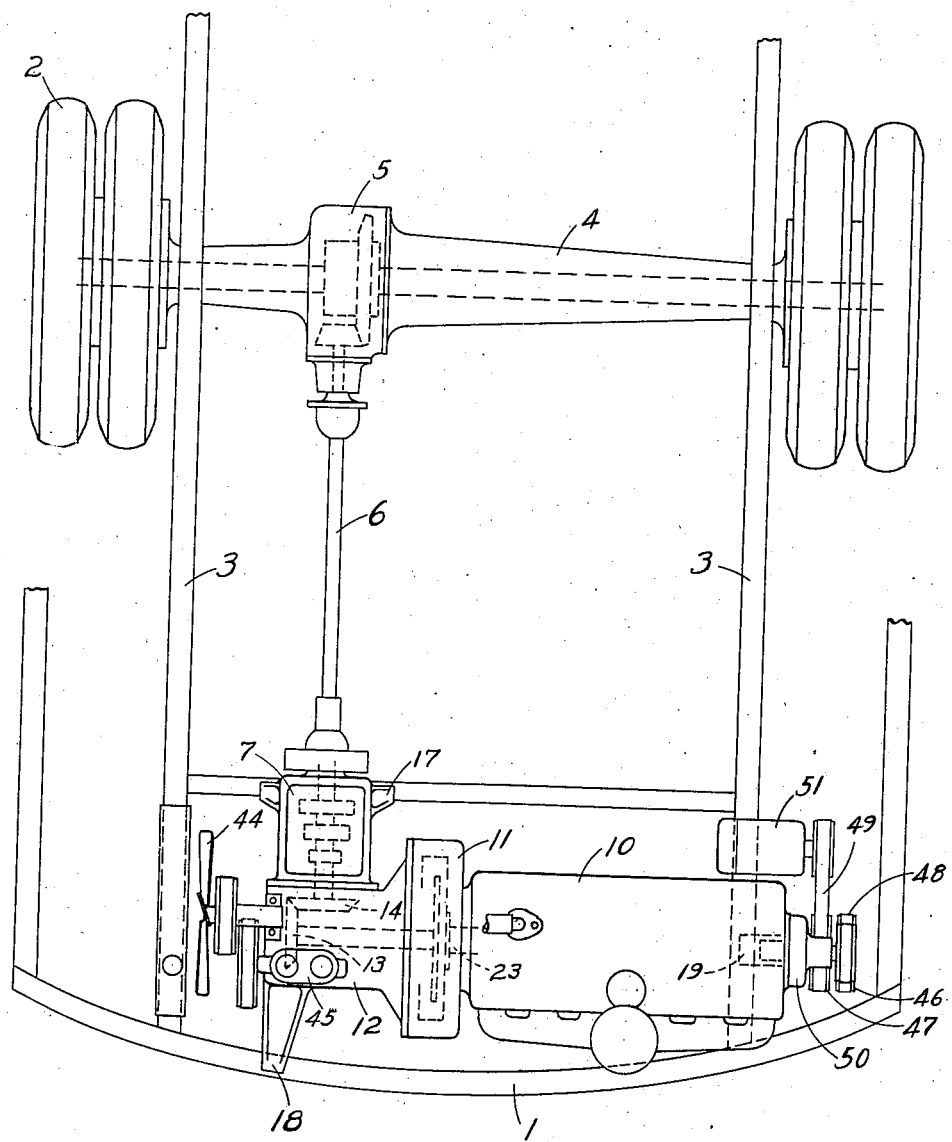

Jan. 2, 1940. H. A. FLOGAUS 2,185,842
MOTOR VEHICLE
Filed Sept. 20, 1937 2 Sheets-Sheet 1

INVENTOR.
Howard A. Flogaus
ATTORNEY.

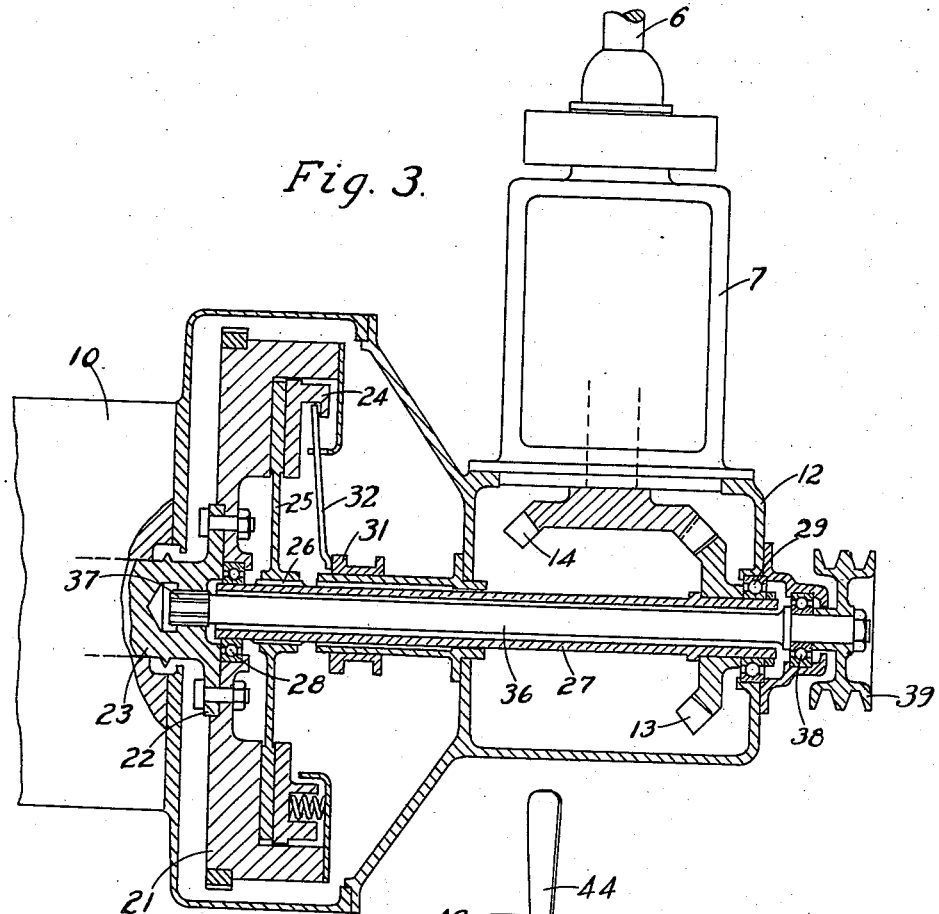
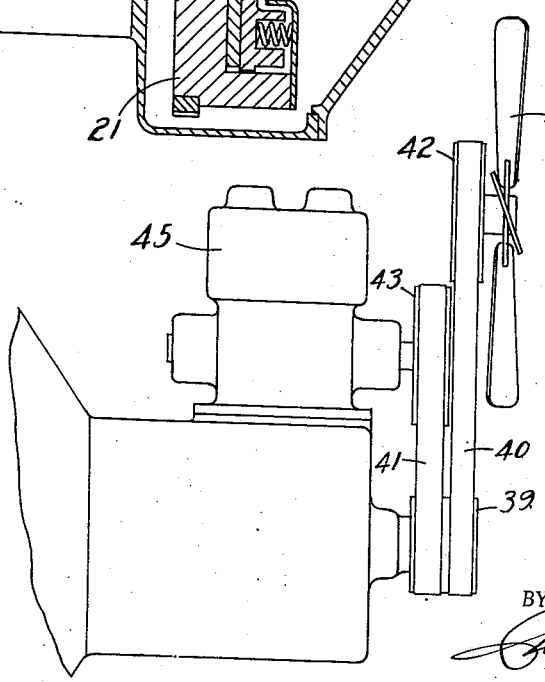

Patented Jan. 2, 1940

2,185,842

UNITED STATES PATENT OFFICE 2,185,842

MOTOR VEHICLE

Howard A. Flogaus, Lansing, Mich., assignor to Reo Motor Car Company, a corporation of Michigan Application September 20, 1937, Serial No. 164,631

5 Claims. (Cl. 180—54)

This invention relates generally to rear engine drives for motor vehicles and more particularly to transversely arranged power plants and the associated driving mechanism for propelling motor buses and trucks.

In order to provide for sufficient power output within the maximum permissible vehicle width it has previously been proposed to place the change speed and differential mechanism in longitudinal alinement with each other and to position the engine and clutch mechanism under the rear passenger seat in transverse alinement but in spaced relation to each other on opposite sides of the longitudinal plane containing the differential and change speed gearing, there being within the intermediate space a gear box and a pair of nested shafts for connecting respectively the engine power shaft with the driving element of the clutch and the clutch driven element with the input shaft of the change speed mechanism through the gear box.

However, in arrangements of the above character the fly-wheel and clutch mechanism being mounted remotely from the engine, an objectionable amount of torsional whip is normally present in the connecting crankshaft extension.

It is an object of the present invention to eliminate the objectionable torsional whip present in constructions of the above character. This objection is overcome in the present instance by mounting the fly-wheel directly on the engine crankshaft and the power is directly transmitted through a clutch mechanism to a hollow shaft and thence through suitable mechanism to the rear wheels of the vehicle.

Another object of the invention is to provide accessibility to and satisfactory driving connections for the cooling fan, air compressor, generator and water circulating pump which are essential associated mechanisms of such power plants.

A further object of the invention is to drive the several accessories at the speeds at which they properly function and to accomplish this object through driving connections directly from the engine crankshaft and from opposite ends thereof.

Still a further object is to construct a power plant in which the associated accessory mechanisms are driven by the engine chankshaft at all times regardless of whether or not the clutch is engaged and to drive the fan and air compressor at comparatively slow speeds while driving the electrical generator and water circulating pump at relatively higher speeds.

Other objects and advantages of the invention will become apparent from a reading of the following description taken in connection with the accompanying drawings, in which Fig. 1 is a top plan view showing the general arrangement of elements.

Fig. 2 is a fragmentary side elevational view of the power plant illustrating the engine with some of its assorted accessory mechanisms, and Fig. 3 is an enlarged sectional view illustrating the fly-wheel, clutch and the driving connections from the engine to the propeller shaft.

In the drawings, reference numeral 1 indicates generally the rear extension frame of a motor bus or truck which may be suitably carried upon the rear vehicle wheels 2 and drive axle 4 by frame members 3. The rear axle 4 is provided in the usual manner with a differential mechanism 5 positioned to one side of the longitudinal center line of the vehicle and to which is connected by means of a propeller shaft 6, a conventional change speed gearing mechanism 7.

The power plant for driving the propeller shaft 6 is transversely arranged on the extension frame 1 and comprises generally an internal combustion engine 10, a fly-wheel and clutch mounted in a housing 11, a housing 12 containing driving and driven bevelled pinions 13 and 14 respectively, and change speed transmission gearing 7 which may be bolted or otherwise secured to the gear box 12 in angular relation thereto as shown in Fig. 1. This entire unitary structure may be suitably secured on the rear extension frame as at 17, 18 and 19.

The driving connections from the engine 10 to the propeller shaft 6 are particularly shown in Fig. 3 and comprise a fly-wheel 21 bolted or otherwise secured to an annular flange 22 of the engine crankshaft 23 and having suitable driving clutch mechanism 24 associated therewith to frictionally engage a driven clutch member 25 which is splined as at 26 to a hollow driving shaft 27 mounted at one end in bearings 28 adjacent the crankshaft 23 and at its opposite end in bearings 29 carried by the walls of the gear box 12.

A conventional clutch control collar 31 may be slidably positioned on the hollow shaft 27 and arranged to contact clutch control fingers 32 for effecting engagement and disengagement of the clutch mechanism.

A bevelled driving pinion 13 is keyed to the hollow shaft 27 adjacent the end thereof remote from the clutch mechanism and within the gear box 12 and is arranged to engage a similar bevelled driven pinion 14 fixed to the input shaft of the change speed transmission mechanism 7.

From the description thus far it will be understood that power generated by the internal combustion engine 10 is transmitted from the crankshaft 23 through the fly-wheel 21 and the driven clutch element 25 to the hollow driven shaft 27 and thence through the bevelled pinions 13 and 14 to the variable speed mechanism 7 and propeller shaft 6 which in turn is connected to drive the rear wheels 2 of the vehicle through the differential 5 and axle 4.

By thus placing the fly-wheel 21 directly on the end of the crankshaft 23, the torsional whip normally present in arrangements of this general character is eliminated.

In large motor bus or truck units, it is desirable to drive the engine accessories such as the water pump, generator, air compressor and cooling fan directly from the crankshaft rather than through the clutch mechanism so that these accessories may function whether or not the clutch is engaged. Moreover, it is particularly desirable to group these accessories in such a manner that the water pump and generator are driven at comparatively high speeds while the air compressor and cooling fan are driven at relatively lower speeds.

To accomplish these results, an extension shaft 36 is splined to the crankshaft 23 as at 37 and extends through the hollow shaft 27 to the opposite side of the gear box 12 where it is suitably mounted in bearings 38 and provided on its outer end with a relatively small double pulley 39 which is connected by means of belts 40 and 41 to the relatively large pulleys 42 and 43 respectively of the cooling fan 44 and air compressor 45.

As shown in Fig. 1 the opposite end of the crankshaft 23 extends through the crank case and is provided with relatively large pulleys 46 and 47 which are connected respectively by belts 48 and 49 to a water circulating pump 50 and an electrical generator 51 by means of relatively small pulleys carried by each of these units.

In the manner above described all of the engine accessories are driven directly from the crankshaft and grouped in such a manner that the water pump and electrical generator are driven at relatively high speeds while the cooling fan and air compressor are driven at comparatively low speeds. In addition to this excellent grouping of accessories, a construction is provided wherein an efficient drive for the vehicle is obtained without the usual attendant difficulties present in arrangements of this character.

What is claimed and desired to be secured by Letters Patent is:

1. In a motor vehicle driving mechanism, an internal combustion engine having a crankshaft, a fly-wheel mounted on one end of said crankshaft, a clutch mechanism associated with said fly-wheel, a gear box including a power take-off mechanism, and an accessory drive pulley all positioned in serial arrangement in the order named, a hollow shaft extending from the clutch mechanism into the gear box and connecting the driven clutch element to the power take-off mechanism, a second shaft extending through said hollow shaft and connecting the engine crankshaft with said accessory drive pulley, and a change speed mechanism connected to said power take-off and extending longitudinally in angular relation to said shafts.

2. In a motor vehicle driving mechanism, a pair of drive wheels, an engine disposed transversely of the vehicle, the said engine having a crankshaft extending from both ends thereof, an accessory drive pulley on one end of said crankshaft and a clutch mechanism on the other end of said crankshaft, a constantly driven shaft secured to said crankshaft and extending through said clutch and terminating in a drive pulley, a hollow drive shaft overlying said extension shaft and coupled to said clutch on the side farther from said engine, a drive pinion on said hollow shaft, a driven pinion meshing therewith, a change speed mechanism connected to said driven pinion, and means including a driven shaft and a differential mechanism for transmitting power from the change speed mechanism to said drive wheels.

3. A motor vehicle power plant unit including an internal combustion engine having a crankshaft extending outwardly from each end thereof, a clutch, a power take-off mechanism, separate speed groups of engine driven accessories mounted on said engine, an extension shaft extending from one end of said crankshaft, the other end of said crankshaft being provided with a drive pulley for operating one group of said accessories and said extension shaft passing in succession through the clutch, the power take-off mechanism, and another drive pulley, to the latter only of which it is connected for operating a second group of accessories, and a change speed power transmission mechanism mounted adjacent to and receiving power from said power take-off mechanism.

4. In a motor vehicle driving mechanism, an internal combustion engine disposed transversely of the vehicle and having a crankshaft extending from each end thereof, a fly-wheel connected directly to one end of said crankshaft, a driven clutch element associated with said fly-wheel and a gear box including power take-off mechanism, all positioned in serial arrangement in the order named, a hollow shaft connecting the driven clutch element to said power take-off mechanism within said gear box, a generator for said engine, a water pump for said engine, means including a shaft extending within the hollow shaft and connected to the crankshaft for driving said generator and pump at all times when the engine is running, an air compressor, and a cooling fan, both compressor and fan being driven by the other end of said crankshaft.

5. In a motor vehicle drive mechanism, an internal combustion engine disposed transversely of the vehicle and having a crankshaft extending from one end thereof, a fly-wheel connected directly to said crankshaft, a driven clutch element associated with said fly-wheel, a gear box including power take-off mechanism, and a change speed mechanism connected to said power take-off mechanism in angular relation thereto, all positioned in serial arrangement in the order named, a hollow shaft connecting the driven clutch element to said power take-off mechanism within said gear box, and a second shaft connected to said engine crankshaft and extending within said hollow shaft for driving an engine accessory at all times when the engine is running.

HOWARD A. FLOGAUS.

CERTIFICATE OF CORRECTION.

Patent No. 2,185,842.  January 2, 1940.

HOWARD A. FLOGAUS.

It is hereby certified that error appears in the printed specification of the above numbered patent requiring correction as follows: Page 1, second column, line 8, for the word "assorted" read associated; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.